Patented July 13, 1954

2,683,649

UNITED STATES PATENT OFFICE 2,683,649

METHOD OF PURIFYING BRINE

Alfred Hirsch, Painesville, Ohio, assignor to Diamond Alkali Company, Cleveland, Ohio, a corporation of Delaware No Drawing. Application December 6, 1951,
Serial No. 260,310

5 Claims. (Cl. 23—89)

This invention relates to a method for controlling the sulfate ion concentration of a substantially saturated sodium chlorine brine containing dissolved sulfate salts.

In the manufacture of sodium chemicals, such as caustic soda, soda ash, and sodium bicarbonate, the obtaining of a relatively pure, substantially saturated, sodium chloride brine is of paramount importance.

In the ammonia-soda process for the manufacture of caustic soda, soda ash, and sodium bicarbonate from sodium chloride brine, the sulfate ion content of the brine employed as a principal raw material contributes to the fouling of process liquor lines and other equipment, by reason of the deposition of insoluble calcium sulfate upon the surfaces of such equipment with which the process solutions come in contact. In the manufacture of caustic soda by the electrolytic method, wherein a sodium chloride brine is decomposed electrolytically to form chlorine, hydrogen, and caustic soda, the sulfate ion content of the brine contributes materially to the erosion of the carbon electrodes of the electrolytic cells.

The brine used in these processes is commonly prepared by bringing water into dissolving contact with a body of impure sodium chloride, such as rock salt, usually in the form of a deposit many hundreds of feet below the earth's surface. In those manufacturing operations which do not have a salt deposit readily accessible, the brine is prepared by placing granulated salt in large dissolving tanks and bringing water into dissolving contact with the impure rock salt in the tanks. The so-prepared brine is obtained as a substantially saturated aqueous solution of sodium chloride containing minor but significant amounts of other salts, such as magnesium chloride, calcium sulfate, sodium sulfate, and magnesium sulfate, as well as iron and aluminum salts, also dissolved therein.

The removal of calcium, magnesium, iron, and aluminum ions from the brine is commonly effected by first making the brine slightly alkaline, for example, by adding thereto a suitable amount of lime (CaO) or alkali metal hydroxide. The precipitate of magnesium, iron, and aluminum hydroxides which forms is allowed to settle and is separated by decantation. Thereafter, the calcium ions remaining in the brine are precipitated by carbonating the brine with sodium or ammonium carbonate in order to effect a precipitation of insoluble calcium carbonate. The insoluble calcium carbonate is readily separated from the remainder of the brine solution by settling and/or filtration. This method of purifying a brine solution does not diminish the sulfate ion concentration of the brine appreciably and the sulphate ions, when carried over into the chemical process for the production of soda ash, caustic soda, magnesium oxide, precipitated whiting, or into the electrolytic cells of the electrolytic process for the manufacture of caustic soda and chlorine by the electrolysis of brine, deleteriously affect the process equipment.

The effects of appreciable sulfate ion concentration in the brine are most apparent and most costly in that part of the ammonia-soda process, and the magnesium oxide process, commonly referred to the the "ammonia still." In such an ammonia still, a feed liquor consisting principally of ammonium chloride, ammonium carbonate and bicarbonate, and sodium bicarbonate is fed to the top of a decomposing tower, wherein the feed liquor is brought into direct contact with live steam, thereby to decompose the ammonium carbonate and bicarbonate to ammonia and carbon dioxide. As the feed liquor leaves the "ammonia section" of the still in which the ammonium carbonate and bicarbonate are decomposed, it is mixed with an aqueous slurry of lime or dolomitic lime in what is commonly termed the "prelimer" of the ammonia still, from which it passes to the "lime section." In this portion of the ammonia still, the alkaline slurry of lime reacts with the ammonium chloride to form ammonia and calcium chloride, respectively. Appreciable sulfate ion concentration in the liquor fed to the ammonia still causes copious precipitation of calcium sulfate in the lime section of the still, which precipitation may be due in part to the high temperature of the liquor in this region and the high concentration of calcium therein, since calcium sulfate is less soluble in hot aqueous media than in cold aqueous media. In any case, gradual deposition of a heavy, stone-like, monolithic layer of calcium sulfate ensues in the lime section of the still, which layer must be manually dislodged periodically, for example, every 80 to 100 days. Removing the stone-like deposit of calcium sulfate from the lime section of the ammonia still is a costly and time-consuming operation involving many man hours of labor and suspended use of equipment.

The problem of economically controlling the casual sulfate ion concentration of the salt brine fed to the above-described chemical processes to a point where the accumulation of the calcium sulfate deposit is thereby also brought under control, has not heretofore been satisfactorily solved.

The methods heretofore proposed for diminishing the sulfate ion concentration of a substantially saturated sodium chloride brine fall into two relatively broad classes, neither of which has offered a satisfactory means of economically controlling the sulfate ion concentration of the brine. The first of these classes consists essentially in methods for suppressing the solubility of sodium sulfate, calcium sulfate, magnesium sulfate, and the like at the situs of the dissolution of the impure salt, whether such situs be within a cavity of a subterranean deposit of rock salt, or in a large dissolving tank located above ground and integrated with a chemical process.

The second of these two classes of methods is directed to chemical treatment of the sodium chloride brine after it leaves the situs of dissolution of the impure salt, and for the most part includes the addition of expensive reagents, such as barium chloride, which would substantially completely eliminate sulfate ion from the brine being treated.

One of the objects of the present invention is to provide an economical method for controlling the sulfate ion concentration of sulfate-containing, substantially saturated, sodium chloride brines.

Another of the objects of the present invention is to provide an economical method for controlling the sulfate ion concentration of substantially saturated sodium chloride brines employed in the manufacture of alkalies, and in the recovery of magnesia from dolomitic limestone, to the end that the rate and the amount of sulfate scale deposited upon exposed surfaces of process equipment are likewise brought under control.

A further object of the invention is to provide a method for controlling the sulfate ion concentration of a sulfate-containing, substantially saturated, sodium chloride brine, which may be integrated with conventional methods of brine purification without substantial alteration of equipment used for such methods.

These and other objects of the invention will be apparent to those skilled in the art from the description of the invention and experimental data provided hereinbelow.

During the processing of saturated sodium chloride brines in the manufacture of alkalies and magnesia, the concentration of the impurities in the brine, e. g., sulfate ion concentration, is lessened somewhat due to dilution of the process liquors, and chemical process liquors of the class hereinabove described may contain less than about 1.5 grams of sulfate per liter without causing the deposition of calcium sulfate scale. Also, it has been observed that when the sulfate ion concentration of the sodium chloride brine rises appreciably above about 2 grams (0.021 mole) of sulfate per liter, the sulfate ion concentration of the process liquors may rise above about 1.5 grams of sulfate ion per liter, in which instance the rate of deposition of the calcium sulfate scale within the ammonia still becomes excessive, in that at frequent intervals the still must be taken out of service and the calcium sulfate layer removed from the exposed surfaces internally of the still. If, however, after a still has been cleaned and put on stream, the sulfate ion concentration of the brine is allowed to rise to 3–5 grams (0.031–0.053 mole) of sulfate ion per liter for a relatively short period of time in the initial operation of the still, and thereafter so controlled as to diminish the sulfate ion concentration of the brine to somewhat less than about 2 grams per liter, there is deposited upon the exposed surfaces internally of the ammonia still during this initial period, a substantial monolithic layer of the calcium sulfate scale which protects such exposed surfaces from the corrosive effects of the process liquors and tends to insulate the still from loss of heat. Thereafter, the rate at which the calcium sulfate scale is deposited may be so controlled as substantially to approach 0, by maintaining the sulfate ion concentration of the brine at somewhat less than about 2 grams per liter.

In accordance with the present invention, the sulfate ion concentration of a substantially saturated sodium chloride brine having a sulfate ion concentration above about 2 grams of sulfate per liter of brine, is controlled by a method which includes the steps of adding calcium chloride to said brine sufficient to provide a molar ratio of calcium to sulfate ion above about 2.4:1, while maintaining the substantial saturation of said brine with respect to sodium chloride, agitating the mixture of said brine and said calcium chloride for a period sufficient substantially to establish equilibrium conditions in said mixture and to precipitate calcium sulfate from said mixture, and separating said calcium sulfate from said mixture after said period.

In practicing the method of the present invention, a suitable amount of calcium chloride, sufficient to provide a molar ratio of $Ca:SO_4$ above about 2.4:1, is added to the raw brine to be treated, either before or after such brine has been rendered alkaline, to remove magnesium, iron, and aluminum salts dissolved therein. The amount of calcium chloride to be added to provide the desired ratio of $Ca:SO_4$ is calculated on the basis of the calcium and sulfate ion concentration of the brine and does not include substances, such as lime or solid calcium sulfate, which may be added to the brine together with the calcium chloride.

It is preferable in the treatment of a raw sodium chloride brine by the conventional method for its preparation for use in the ammonia-soda process, or in the recovery of magnesium oxide from dolomitic limestone, to add the calcium chloride prior to, or simultaneously with, the step of rendering the brine alkaline in order not to bring an additional settling or filtering step into the process, whereby additional apparatus would be required for purifying the brine. In accordance with this preferred method, calcium chloride and an alkaline material, such as lime, caustic soda, or the like, are added simultaneously to the brine, whereby hydroxides of magnesium, iron, aluminum, and calcium sulfate are precipitated together in a single step. In such preferred practice, the amount of lime added does not enter into the calculation of the amount of calcium chloride to be added.

It is of importance in practicing the method of the present invention to maintain substantial saturation of the brine with respect to sodium chloride during the step of adding calcium chloride and the alkaline material to the brine, since any appreciable dilutions thereof will not only affect the efficiency of subsequent chemical reactions in the process but will also tend to increase the solubility of the calcium sulfate in the brine, whereby the efficiency of the sulfate removing step is impaired. It is, therefore, also preferred practice, when adding the calcium chloride to the brine, to add either solid calcium chloride or a solution of calcium chloride containing from about 150–550 grams of calcium chloride per liter, which solution in turn is saturated with respect to sodium chloride. Where feasible, solid sodium chloride may be added to the brine to maintain saturation in the event that the solution of calcium chloride is unsaturated.

On the basis of cost and ease of material handling, it is preferable to add the calcium chloride in the form of an aqueous solution, for example, a solution containing from about 250–550 grams of calcium chloride per liter, which solution is also saturated with respect to sodium chloride. Such a solution is readily obtainable in conjunction with the ammonia-soda process in the form of a waste effluent calcium chloride liquor, which liquor for the purposes of this invention may be concentrated to substantial saturation with respect to sodium chloride, or to which sodium chloride may be added to effect substantial saturation.

Where the amount of calcium chloride added to the sodium chloride brine is sufficient to provide in the brine solution a molar ratio of dissolved calcium to dissolved sulfate substantially above about 2.4:1, preferably about 2.4:1 to about 6:1, and the mixture of calcium chloride and brine is agitated for a period of time sufficient substantially to establish equilibrium conditions within the solution, precipitation of calcium sulfate is not apparent for several hours. Thereafter, minute crystals of calcium sulfate begin to appear within the body of brine being treated, and the rate at which calcium sulfate is precipitated from solution increases rather rapidly up to a point where the sulfate ion concentration reaches about 1 gram per liter, after which the rate of precipitation decreases again, indicating the approach of the system to substantially equilibrium conditions. It is, therefore, preferred in the practice of the method of the present invention to slurry a relatively small amount of calcium sulfate, for example, finely divided natural or precipitated gypsum ($CaSO_4 \cdot 2H_2O$), in the amount of 0.5 gram to 3 grams per liter of brine to be treated, in the calcium chloride solution in order to "seed" the sulfate-containing brine, thereby inducing precipitation of the calcium sulfate substantially immediately and shortening the period required to obtain substantial equilibrium conditions. Again, it is to be noted that the amount of solid calcium sulfate added does not enter into the calculation of the amount of calcium chloride to be added to the brine to provide the desired ratio of $Ca:SO_4$ therein.

In accordance with the above preferred practice, it has been found that substantially equilibrium conditions may be obtained within a matter of one-half to one hour from the time the slurry of calcium sulfate in the calcium chloride solution is added to the brine. This method of treating a sodium chloride brine contaminated with appreciable amounts of sulfate impurities has been found to be especially effective in the separation of the purified brine from the precipitate containing calcium sulfate, and the hydroxides of magnesium, iron, and aluminum, either by filtration or by settling of the precipitate, in which it is desirable to have relatively large particles of the precipitate to be filtered or settled. The solid calcium sulfate added to the brine to accelerate precipitation of calcium sulfate may be added thereto following the addition of the calcium chloride, either as a finely divided solid or as a slurry in the substantially saturated calcium chloride solution which is also saturated with respect to sodium chloride.

It will be appreciated by those skilled in the art that, in general, it is preferable to combine the solution of calcium chloride saturated with respect to sodium chloride, the solid calcium sulfate, and the alkaline agent, such as lime or caustic soda, as a unitary treating agent for the brine, rather than adding the three reagents in successive separate steps, and that subsequent to the removal of the precipitates formed, removal of calcium ions by carbonation of the brine and precipitation of calcium carbonate in the conventional manner may be resorted to.

In order that those skilled in the art may better understand the method of the present invention and in what manner the same may be carried into effect, the following specific examples are offered:

In each of the following examples, the substantially saturated sodium chloride brine referred to is obtained by hydraulically mining crude rock salt in a subterranean deposit; also, the values given for the $Ca:SO_4$ ratios do not include amounts of lime or calcium sulfate added to the brine:

*Example I*

A substantially saturated sodium chloride brine containing about 1.4 grams of calcium ion, and 3.34 grams of sulfate ion, per liter of brine is combined with the reagents (as solids) indicated in the table below, agitated at room temperature for a period of 2½ hours, filtered, and the filtrate analyzed with the results shown in the table:

| Per Liter of Brine Treated | Gms. of $SO_4$ Ion/l. After Treatment | Percent Diminution $SO_4$ Ion Conc. | Molar Ratio $Ca:SO_4$ |
|---|---|---|---|
| 1. (a) 5 gms. NaCl<br>(b) 3 gms. $CaCl_2$<br>(c) 5 gms. $CaSO_4 \cdot 2H_2O$ | 3.76 | ---------- | 1.77:1 |
| 2. (a) 25 gms. NaCl<br>(b) 5 gms. $CaCl_2$<br>(c) 5 gms. $CaSO_4 \cdot 2H_2O$ | 2.94 | 12 | 2.30:1 |
| 3. (a) 25 gms. NaCl<br>(b) 10 gms. $CaCl_2$<br>(c) 5 gms. $CaSO_4 \cdot 2H_2O$ | 1.90 | 43 | 3.60:1 |
| 4. (a) 25 gms. NaCl<br>(b) 15 gms. $CaCl_2$<br>(c) 5 gms. $CaSO_4 \cdot 2H_2O$ | 1.37 | 59 | 4.85:1 |

*Example II*

The data in the following table show the effect, upon the sulfate ion concentration, to be obtained by the treatment of substantially saturated sodium chloride brines with the various chemicals and combinations of chemicals, as comminuted solids, indicated in the table. These brines contain Ca and $SO_4$ substantially in the molar ratio of 1:1. Unless otherwise indicated, the time allowed for substantial equilibrium within the solution to be obtained in two hours:

| Per Liter of Brine Treated | Gms. of $SO_4$ Ion/l. @ Start | Gms. of $SO_4$ Ion/l. After Treatment | Percent Diminution $SO_4$ Ion Conc. |
|---|---|---|---|
| 1. 25 gms. NaCl | 2.58 | 2.60 | 0 |
| 2. (a) 25 gms. NaCl<br>(b) 5 gms. CaO | 2.58 | 2.07 | 20 |
| 3. (a) 25 gms. NaCl<br>(b) 10 gms. CaO | 2.58 | 2.12 | 19 |
| 4. (a) 5 gms. NaCl<br>(b) 7 gms. $CaCl_2$<br>(c) 0.5 gm. CaO<br>(d) 2 gms. $CaSO_4 \cdot 2H_2O$ | 2.93 | 1.53 (@ 1 hr. fr. start). | 47.8 |
| 5. (a) 5 gms. NaCl<br>(b) 7 gms. $CaCl_2$<br>(c) 0.5 gm. CaO | 2.93 | 2.33 (@1 hr. fr. start). | 20.5 |
| 6. (a) 25 gms. NaCl<br>(b) 12 gms. $CaCl_2$<br>(c) 5 gms. $CaSO_4 \cdot 2H_2O$ | 2.93 | 0.96 (@ ½ hr. fr. start). | 67.2 |
|  |  | 0.96 (@ 2 hrs. fr. start). | 67.2 |

MOLAR RATIO—$Ca:SO_4$

| 1 | 1:1 (substantially). | 4 | 3.3:1 |
|---|---|---|---|
| 2 | 34:1 | 5 | 3.3:1 |
| 3 | 68:1 | 6 | 5.0:1 |

It will be noted from the data in the above table that the addition of solid sodium chloride to the brines does not effect the salting out of a sulfate salt, that lime (CaO) alone has only a limited and very minor effect upon sulfate ion concentration, and that the addition of solid calcium sulfate (gypsum) to the brine together with calcium chloride is the most efficient combination of the group, with or without added lime, for the diminution of the sulfate ion concentration.

*Example III*

A substantially saturated sodium chloride brine containing 3.35 grams of sulfate ion, and 1.4 grams of calcium ion, per liter of brine is treated with a slurry of solid calcium sulfate (gypsum) in a calcium chloride solution containing 90.7 grams of calcium ion per liter and 107 grams of sodium chloride per liter, in the amounts indicated in the table below. One-half hour after the addition of the calcium chloride solution to the brine, the brine is filtered and the filtrate analyzed for sulfate ion, with the results shown in the table. The reaction mixture is kept at room temperature (20°–25° C.) throughout the treatment:

| Per Liter of Brine Treated | Gms. of $SO_4$ Ion/l | Percent Diminution $SO_4$ Ion Conc. | Molar Ratio Ca:$SO_4$ |
|---|---|---|---|
| 1. (a) 25 mls. of the CaCl₂ soln<br>(b) 1 gm. CaSO₄·2H₂O (200 mesh¹)<br>(c) 0.5 gm. CaO | 2.79 | 16.7 | 2.6:1 |
| 2. (a) 35 mls. of the CaCl₂ soln<br>(b) 1 gm. CaSO₄·2H₂O (200 mesh¹)<br>(c) 0.5 gm. CaO | 1.95 | 41.8 | 3.3:1 |
| 3. (a) 50 mls. of the CaCl₂ soln<br>(b) 1 gm. CaSO₄·2H₂O (200 mesh¹)<br>(c) 0.5 gm. CaO | 1.55 | 53.7 | 4.25:1 |
| 4. (a) 75 mls. of the CaCl₂ soln<br>(b) 1 gm. CaSO₄·2H₂O (200 mesh¹)<br>(c) 0.5 gm. CaO | 1.11 | 66.8 | 5.90:1 |

¹ Screen sizes are U. S. Bureau of Standards, Standard Screen Series, 1919.

*Example IV*

A substantially saturated sodium chloride brine containing 3.35 grams of sulfate ion, and 1.4 grams of calcium ion, per liter of brine is combined with slurries of calcium sulfate in a calcium chloride solution containing 90.7 grams of calcium ion per liter, and 107 grams of sodium chloride per liter, in the amounts indicated in the table below. The molar ratio of Ca:$SO_4$ is kept constant at 4.2:1.

The variables represented in this group of data are time and the particle size of the calcium sulfate (gypsum). Samples of treated brine are taken at the various periods as indicated in the table below, filtered, and the filtrates analyzed for grams of sulfate ion per liter, with the results as shown in the table. The reaction mixtures are kept at room temperature (20°–25° C.) throughout the treatment:

| Per Liter of Brine Treated | Sampling Time Fr. Start of Treatment, Hours | Gms. of $SO_4$ Ion/l | Percent Diminution $SO_4$ Ion Conc. |
|---|---|---|---|
| 1. (a) 50 mls. of the CaCl₂ soln<br>(b) 1 gm. CaSO₄·2H₂O (passes 200 mesh¹)<br>(c) 1 gm. CaO | ½<br>1<br>2 | 1.59<br>1.42<br>1.31 | 52.5<br>57.6<br>60.9 |
| 2. (a) 50 mls. of the CaCl₂ soln<br>(b) 1 gm. CaSO₄·2H₂O (through 100 mesh on 200 mesh¹)<br>(c) 1 gm. CaO | ½<br>1<br>2 | 2.27<br>1.61<br>1.32 | 32.2<br>52.0<br>60.6 |
| 3. (a) 50 mls. of the CaCl₂ soln<br>(b) 1 gm. CaSO₄·2H₂O (through 65 mesh on 100 mesh¹)<br>(c) 1 gm. CaO | ½<br>1<br>2 | 1.63<br>1.44<br>1.33 | 51.4<br>57.0<br>60.3 |

¹ Screen sizes are U. S. Bureau of Standards, Standard Screen Series, 1919.

*Example V*

A substantially saturated sodium chloride brine containing 2.93 grams of sulfate ion, and 1.22 grams of calcium ion, per liter of brine is combined with the chemicals, as comminuted solids, and in the amounts indicated in the table below with the effect upon the sulfate ion concentration there shown. The temperature of the brine undergoing treatment is maintained throughout the experiments between 20°–25° C. (room temperature):

| Per Liter of Brine Treated | Sampling Time From Start of Treatment, Hours | Gms. of $SO_4$ Ion/l. | Percent Diminution $SO_4$ Ion Conc. | Molar Ratio, Ca:$SO_4$ |
|---|---|---|---|---|
| 1. (a) 10 gms. CaCl₂ (3.6 gms. Ca ion)<br>(b) 3 gms. commercial natural CaSO₄·2H₂O | 1 | 1.18 | 56.6 | 4.0:1 |
| 2. (a) 10 gms. CaCl₂ (3.6 gms. Ca ion)<br>(b) 3 gms. pptd. CaSO₄·2H₂O | 1 | 1.18 | 56.6 | 4.0:1 |
| 3. (a) 10 gms. CaCl₂ (3.6 gms. Ca ion)<br>(b) 3 gms. commericial natural CaSO₄·2H₂O<br>(c) 0.5 gm. CaO | 1 | 1.14 | 58.1 | 4.0:1 |
| 4. (a) 7 gms. CaCl₂ (2.5 gms. Ca ion)<br>(b) 2 gms. commercial natural CaSO₄·2H₂O<br>(c) 0.5 gm. CaO<br>(d) 5 gms. NaCl | 1 | 1.50 | 48.7 | 3.1:1 |
| 5. (a) 7 gms. CaCl₂ (2.5 gms. Ca ion)<br>(b) No CaSO₄ added<br>(c) 0.5 gm. CaO<br>(d) 5 gms. NaCl | Sample taken @ 1 hr. for comparison with 4. | 2.33 | 20.5 | 3.1:1 |

While there have been described various embodiments of the invention, the methods described are not intended to be understood as limiting the scope of the invention as it is realized that changes therewithin are possible and it is further intended that each element recited in any of the following claims is to be understood

What is claimed is:

1. The method for controlling the sulfate ion concentration of a substantially saturated sodium chloride brine having a sulfate ion concentration above about 2 grams of sulfate ion per liter of brine, which includes the steps of adding calcium chloride to said brine sufficient to provide a molar ratio of Ca:SO$_4$ ion above about 2.4:1, while maintaining the substantial saturation of said brine with respect to sodium chloride, agitating the mixture of said brine and said calcium chloride for a period sufficient substantially to establish equilibrium conditions in said mixture and to precipitate calcium sulfate from said mixture, and separating said calcium sulfate from said mixture after said period.

2. The method for controlling the sulfate ion concentration of a substantially saturated sodium chloride brine having a sulfate ion concentration above about 2 grams of sulfate ion per liter of brine, which includes the steps of adding to said brine an aqueous solution containing between 150 and 550 grams of calcium chloride per liter and substantially saturated with respect to sodium chloride, the amount of said solution being sufficient to provide a molar ratio of Ca:SO$_4$ ion above about 2.4:1 in said brine, agitating the mixture of said brine and said solution for a period sufficient substantially to establish equilibrium conditions in said mixture and to precipitate calcium sulfate from said mixture, and separating calcium sulfate from said mixture after said period.

3. The method for controlling the sulfate ion concentration of a substantially saturated sodium chloride brine having a sulfate ion concentration above about 2 grams of sulfate ion per liter of brine, which includes the steps of adding to said brine a slurry of solid calcium sulfate in an aqueous solution containing between 150 and 550 grams of calcium chloride per liter and substantially saturated with respect to sodium chloride, the amount of said calcium sulfate being substantially within the range of 0.5 to 3 grams per liter of brine and the amount of said calcium chloride solution being sufficient to provide a molar ratio of Ca:SO$_4$ ion above about 2.4:1 in said brine, agitating the mixture of said brine, said calcium chloride, and said calcium sulfate for a period sufficient substantially to establish equilibrium conditions therein and to precipitate calcium sulfate from said mixture, and separating calcium sulfate from said mixture after said period.

4. The method for controlling the sulfate ion concentration of a substantially saturated sodium chloride brine having a sulfate ion concentration above about 2 grams of sulfate ion per liter of brine, which includes the steps of adding to said brine a slurry of solid calcium sulfate in an aqueous solution containing between 250 and 550 grams of calcium chloride per liter and substantially saturated with respect to sodium chloride, the amount of said calcium sulfate being substantially within the range of 0.5 to 3 grams per liter of brine and the amount of said calcium chloride solution being sufficient to provide a molar ratio of Ca:SO$_4$ ion above about 2.4:1 in said brine, agitating the mixture of said brine, said calcium chloride, and said calcium sulfate at room temperature for a period sufficient substantially to establish equilibrium conditions therein and to precipitate calcium sulfate from said mixture, and separating calcium sulfate from said mixture after said period.

5. The method for controlling the sulfate ion concentration of a substantially saturated sodium chloride brine having a sulfate ion concentration above about 2 grams of sulfate ion per liter of brine, which includes the steps of adding calcium chloride to said brine sufficient to provide a molar ratio of Ca:SO$_4$ ion above about 2.4:1, adding solid calcium sulfate to said brine in an amount substantially within the range of 0.5 to 3 grams per liter of brine, agitating the mixture of said brine, said calcium chloride, and said solid calcium sulfate for a period of time sufficient substantially to establish equilibrium conditions therein and to precipitate calcium sulfate from said mixture, and separating calcium sulfate from said mixture after said period.

References Cited in the file of this patent

UNITED STATES PATENTS

| Number | Name | Date |
| --- | --- | --- |
| 1,252,784 | Cox | Jan. 8, 1918 |
| 2,516,988 | Hengerer | Aug. 1, 1950 |
| 2,521,459 | Hunter et al. | Sept. 5, 1950 |